Figure 1:
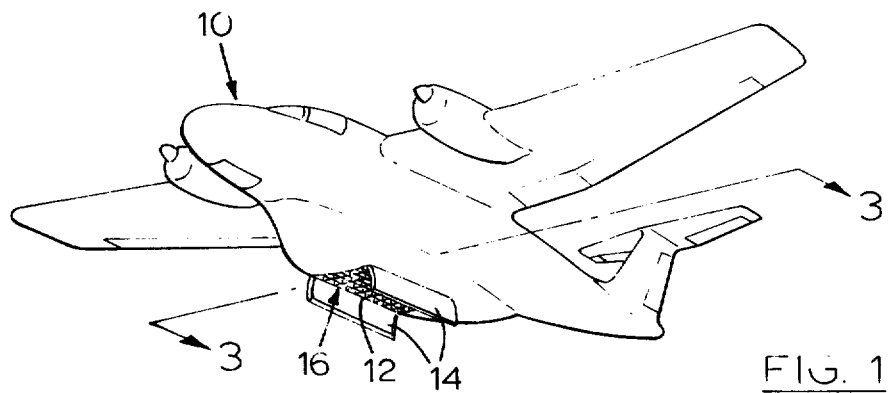

United States Patent [19]

Hawkshaw

[11] 3,901,467

[45] Aug. 26, 1975

[54] AIRCRAFT FIRE BOMBING SYSTEM

[75] Inventor: John Knox Hawkshaw, Brampton, Canada

[73] Assignee: Field Aviation Company Limited, Malton, Canada

[22] Filed: Nov. 6, 1974

[21] Appl. No.: 521,333

[52] U.S. Cl. .................. 244/136; 169/53; 239/171
[51] Int. Cl. ............................................. B64d 1/16
[58] Field of Search......... 244/136, 137 R; 239/171; 169/53, 62

[56] References Cited
UNITED STATES PATENTS

| | | | |
|---|---|---|---|
| 1,911,431 | 5/1933 | Cawley | 244/136 |
| 3,442,334 | 5/1969 | Gousetis | 244/136 X |
| 3,485,302 | 12/1969 | Thorpe | 239/171 X |
| 3,494,423 | 2/1970 | Stansbury et al. | 239/171 X |

Primary Examiner—Trygve M. Blix
Assistant Examiner—Barry L. Kelmachter
Attorney, Agent, or Firm—Fetherstonhaugh & Co.

[57] ABSTRACT

The improved ground pattern of the present invention is achieved by employing a flow control device in the discharge opening of the liquid storage tank of an aircraft. The flow control device is adapted to extend across the discharge opening so as to divide discharging liquid into a plurality of distinct longitudinally spaced streams of liquid which are subsequently separated into a series of distinct globules at discharge from the flow control device. The formation of globules is achieved by regulating the passage of the individual streams through the flow control device so that the passage through which the stream passes has an initial converging portion followed by a diverging portion. The diverging portion of the passage serves to encourage the formation of globules in each stream. The converging portion serves to space the streams from one another. The streams are maintained in the spaced apart relationship by the air stream resulting from the velocity of the aircraft.

11 Claims, 5 Drawing Figures

AIRCRAFT FIRE BOMBING SYSTEM

FIELD OF INVENTION

This invention relates to airborne fire extinguisher systems. In particular, this invention relates to a method and apparatus for controlling the discharge of fire extinguisher liquid from an aircraft for the purposes of extinguishing a fire at ground level.

PRIOR ART

Considerable difficulty has been experienced in attempting to improve the distribution of the fire extinguisher liquid which is dropped from an aircraft in forest fire suppression and other aerial fire control applications. Extensive studies have been made of the ground pattern of the liquid which is dropped from an aircraft and it has been found that only a small proportion of the total area on which the fire extinguisher falls has a concentration of fire extinguisher approaching the optimum amount required to extinguish a fire. In the core areas, an excessive amount of fire extinguisher is present while in the fringe areas an inadequate amount is present.

In my prior U.S. Pat. No. 3,598,342, I have described an apparatus wherein the fire extinguishing liquid is released progressively from the storage tank so as to provide a more even liquid distribution at ground level. This apparatus is, however, rather complex and includes component parts which have to be replaced.

SUMMARY

The present invention overcomes the difficulties of the prior art described above and provides a simple and effective means for controlling the discharge of liquid fire extinguisher from an aircraft to provide improved ground distribution pattern.

The improved ground pattern of the present invention is achieved by employing a flow control device in the discharge opening of the liquid storage tank of an aircraft. The flow control device is adapted to extend across the discharge opening so as to divide discharging liquid into a plurality of distinct longitudinally spaced streams of liquid which are subsequently separated into a series of distinct globules at discharge from the flow control device. The formation of globules is achieved by regulating the passage of the individual streams through the flow control device so that the passage through which the stream passes has an initial converging portion followed by a diverging portion. The diverging portion of the passage serves to encourage the formation of globules in each stream. The converging portion serves to space the streams from one another. The streams are maintained in the spaced apart relationship by the air stream resulting from the velocity of the aircraft.

Figure 3:
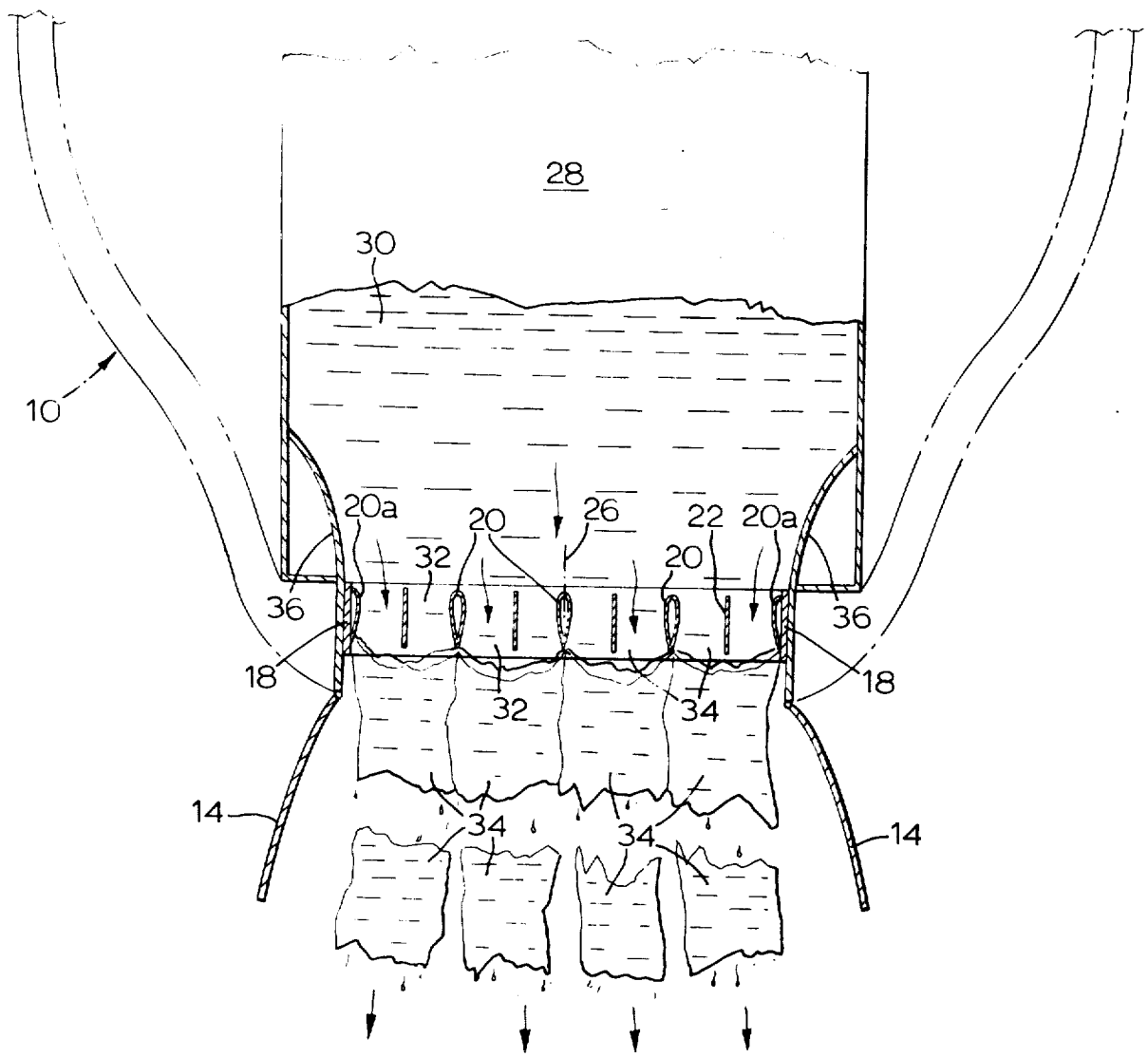
Figure 4:
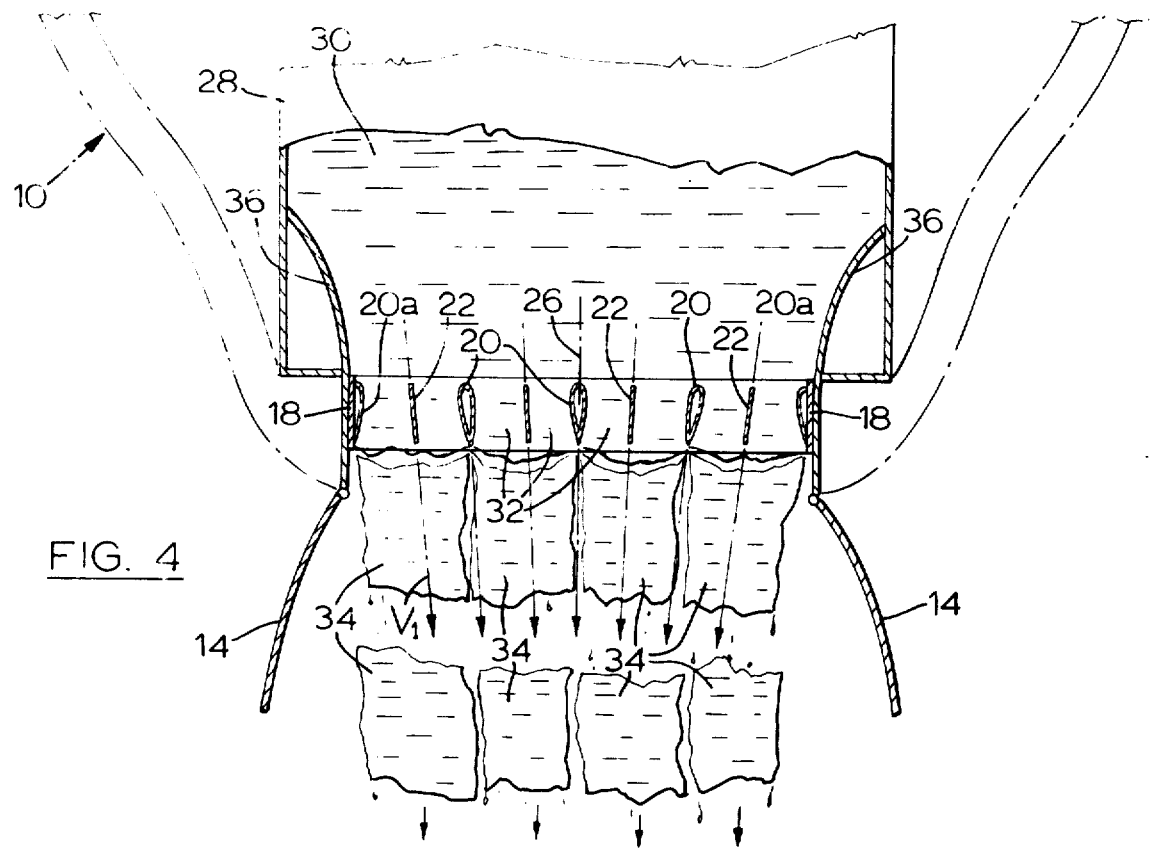
Figure 5:
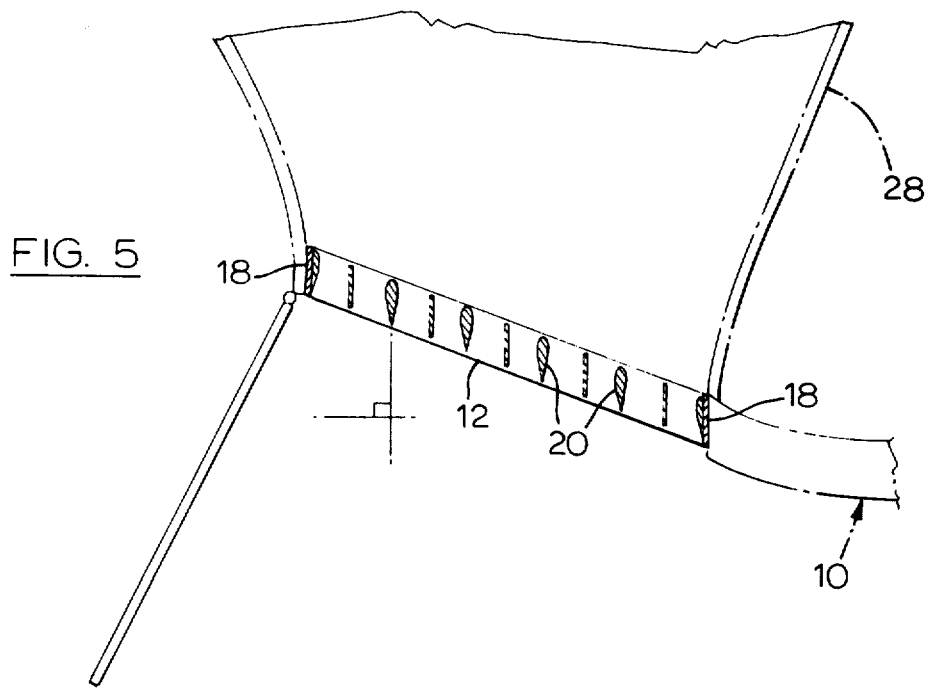

It has been found that the dispersal pattern of the liquid is affected by the last velocity vector imparted to the liquid during its exit from the storage tank. It has been found that in the systems presently in use, the liquid discharging from the tank is subject to considerable turbulence so that the velocity vectors of the particles at exit from the storage tank are such that the particles form into globules of varying sizes, each with different velocity vectors in all three planes. This results in a very non-uniform distribution on the ground with areas of overkill, areas of underkill and voids and the total area is always of excessive width. The excessive width results from the lateral velocity components of the liquid at discharge. Lateral velocity components are unnecessary at discharge in view of the fact that more than sufficient lateral distribution is provided by the air velocity in its erosion of the falling load.

It has been found that by controlling the discharge from the aircraft by the apparatus and according to the method of the present invention, the fuel exit velocity vectors of the discharging load are considerably more vertically oriented with the result that the ground pattern distribution is much more uniform and the lateral width of the discharge is considerably reduced. The present invention introduces a laterally directed choke effect into the lateral velocity vector so that the discharging mass tends to converge laterally at discharge to at least partially offset the divergent effect of the air stream through which the liquid falls and thereby provide a narrower lateral distribution in the ground pattern.

The present invention also produces a final velocity at discharge from the tank which is more uniform over the entire exit area and over the full period of time during which the load is released.

According to a further embodiment of the present invention there is provided in an aircraft having a fire extinguishing liquid storage tank therein which has a discharge opening at the lower end thereof for discharging the fire extinguishing liquid and bomb doors for normally closing the storage tank the improvement of a flow control device in the discharge opening comprising a plurality of calibrator blade means extending longitudinally of the opening, the calibrator blade means being arranged at laterally spaced intervals across the width of the opening, each of the calibrator blades having an inner end disposed inwardly of the tank and an outer end disposed outwardly of the tank, the blades decreasing in thickness in a direction towards the outer ends thereof whereby each of the plurality of minor passages formed by the blades diverge in a direction outwardly thereof.

According to a still further embodiment of the present invention, there is provided a method of regulating the discharging flow of fire extinguisher fluid through a discharge opening of a liquid storage tank of an aircraft comprising the steps of dividing the discharging flow into a plurality of parallel streams extending longitudinally of the discharge opening, discharging each stream through an opening which includes a first converging section which serves to reduce the width of each stream and a second diverging portion which serves to separate adjacent streams from one another upon discharge therefrom and to divide each stream into a series of independent fluid globules.

PREFERRED EMBODIMENT

The invention will be more clearly understood after reference to the following detailed specification read in conjunction with the drawings wherein FIG. 1 is a pictorial view of the underside of an aircraft illustrating the bomb doors in the open position to release fire extinguishing liquid;

FIG. 2 is a pictorial view of the underside of a flow control device according to an embodiment of the present invention;

FIG. 3 is a section taken along the line 3—3 of FIG. 1;

FIG. 4 is a sectional view similar to FIG. 3 illustrating a further embodiment of the present invention; and FIG. 5 is a sectional view similar to FIG. 3 illustrating a flow control device for use in an aircraft having a liquid discharge passage which is inclined with respect to the horizontal plane.

With reference to the drawings, the reference numeral 10 refers generally to an aircraft of a type suitable for use in aerial fire extinguishing operations having a water storage tank discharge opening 12 which is normally closed by bomb doors 14. A flow control device 16 is mounted in the discharge opening so that the liquid discharging from an airborne aircraft passes through the flow control device prior to its release from the aircraft for application to a forest fire or the like.

Figure 2:
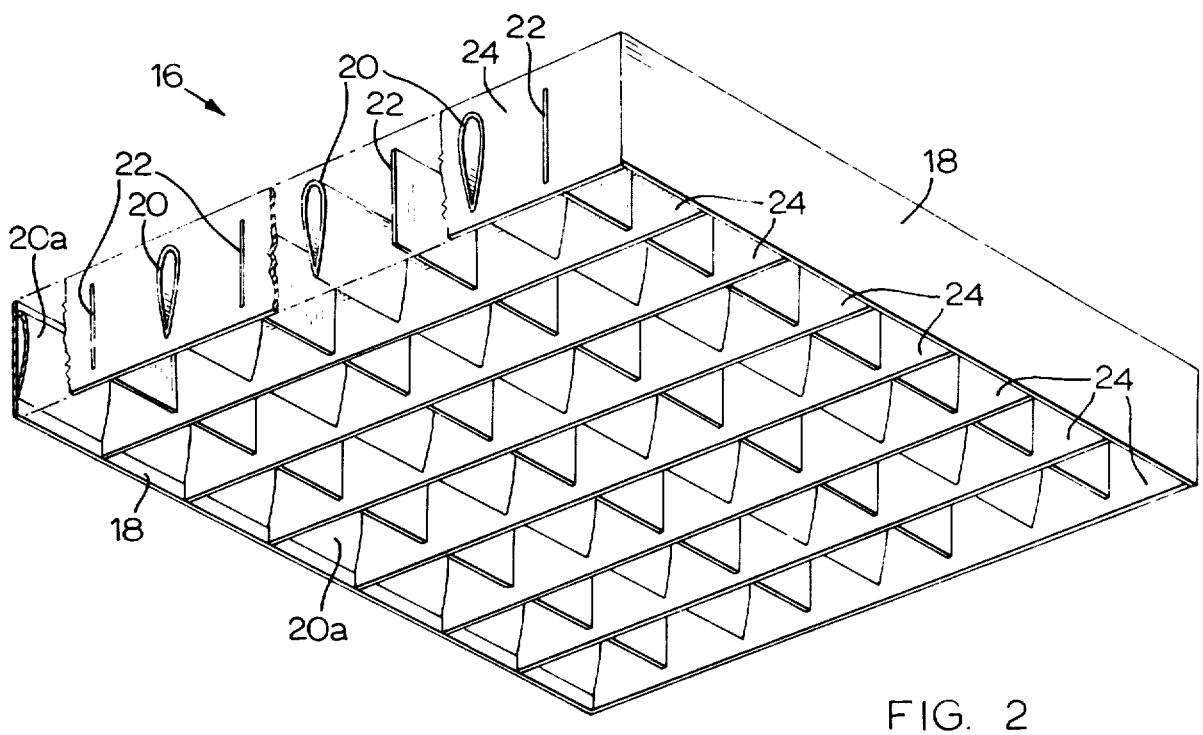

With reference to FIG. 2 of the drawings, it will be seen that a flow control device 16 according to an embodiment of the present invention comprises a pair of oppositely disposed side wall members 18, a plurality of calibrator blades 20, a plurality of straightener vanes 22, and a plurality of transversely extending beam members 24. The calibrator blades 20 and vanes 22 are supported in their spaced parallel relationship by the transverse bridge members 24 which are in turn secured to the oppositely disposed side wall members 18. The calibrator blades 20 and separator vanes 22 are located with respect to the side walls 18 so that they extend longitudinally of the opening 12 as shown in FIG. 3 of the drawings. It will be noted that half-section calibrator blades 20a are mounted on the inwardly directed face of oppositely disposed side wall members 18. The calibrator blades 20 are symmetrical about axis 26 and are of streamlined configuration. The blades 20 have an inner end directed inwardly of the water storage tank 28 and an outer end directed outwardly of the water storage tank 28. The calibrator blades 20 have a first portion at the inner end thereof which diverges rapidly along a curved path so that the blade has a maximum width closely adjacent the inner end thereof, the blade having a second converging portion extending downwardly from the maximum width to the outer end of the blade at which the blade is relatively thin. The adjacent blades 20 and partial blades 20a cooperate with one another to initially divide the discharging fire extinguisher liquid 30 into a plurality of streams 32. During the passage of the streams 32 between proposed calibrator blade members, each stream is initially reduced in lateral width as it passes over the first converging section of the adjacent calibrator blades and thereafter each stream 32 passes through the expanding second portion of the passage formed between the adjacent calibrator blades. The passage of each stream 32 through the lateral reduction portion and thereafter the expanding portion of the passage formed between adjacent calibrator blades causes the discharging flow from the calibrator blades to divide the discharging streams into a plurality of large globules 34 which are spaced from one another.

The dimensional proportions of the various components of the flow control device 12 of the present invention will vary according to the capacity of the liquid storage tank of the aircraft and the size of the discharge opening. In a small capacity device which has a relatively long discharge opening, it may be possible to dispense with the straightener vanes 22. The straightener vanes 22 are employed in the embodiments illustrated to reduce the turbulence in the flow between the adjacent calibrator blades and in applications where the turbulence can be reduced by using calibrator blades 30 which are relatively long and wide with respect to the proportions of the discharge opening, it may be possible to eliminate the straightener vanes 22 from the structure of the flow control device.

In an installation wherein the lateral width of the discharge passage of the aircraft measures about 24 inches, a flow control device according to an embodiment of the present invention may have calibrator blades measuring about 5½ inches in height from the inner end thereof to the outer end thereof. The calibrator blades may have a maximum width of about 1 inch and may reach the maximum width at about 1.25 inches from the inner end thereof. A total of four calibrator blades 20 may be equally spaced across the width of bridge members 24 which have a height of about 5½ inches and are longitudinally spaced with respect to one another at about 3 inch intervals. The straightener vanes 32 are disposed equidistant between adjacent vanes and have an overall height of about 4 inches. The calibrator blades 20, straightener vanes 22, bridge members 24 may be made from sheet aluminum alloy such as 2024 aircraft aluminum alloy having a gauge thickness in the range of 0.020 inch to 0.065 inch.

The flow control device of the present invention may be mounted in the discharge passage of a liquid storage tank by any suitable means such as mounting screws, latches or the like and may be adapted to be readily removed from the discharge passage to permit the aircraft to be used for other purposes.

As previously indicated, the air stream surrounding the discharging body of liquid tends to disperse the liquid laterally. This effect is counteracted in the embodiment of the invention illustrated in FIG. 4 of the drawings by angularly inclining the calibrator blades at either side of the central plane so that the velocity vectors $V_1$ of the discharging globules are downwardly and inwardly inclined. It has been found that by angularly inclining the axes of the calibrator blades at an angle of about 5° to the vertical, the lateral dispersal of the discharging load can be significantly reduced.

An important object of the present invention is the reduction of turbulence in the flow of liquid through the flow control divice. As previously indicated, turbulence is reduced by the provision of the calibrator blades, straightener vanes and laterally extending bridge members. In most storage tanks 28 presently installed in aircraft, the width of the outlet opening is substantially less than the lateral width of the tank. The fact that the liquid is discharging over a ledge formed at the bottom wall of the tank by reason of the fact that the discharge opening is smaller than the bottom wall of the tank further increases the turbulence which is created. Furthermore, the turbulence caused by these ledges is in the area of the flow at the side edges of the opening. It is the liquid flowing through this area which is subjected to the major influence of the air stream which causes the excessive lateral dispersement described above. It follows that the area of the discharging load which is most susceptible to influence by the air stream is the area which is the most turbulent at the point of discharge. This difficulty has been substantially reduced in the present invention by providing arcuate shaped shoulder panels 36 which extend upwardly from the upper edge of the side wall portions of the flow control device to the adjacent side walls of the tank 28. The panels 36 serve to substantially reduce the turbulence and to straighten the liquid flow towards the flow control device.

Various modifications of the present invention will be apparent to those skilled in the art without departing from the scope of the invention. A typical modification is illustrated in FIG. 5 of the drawings wherein the flow control device 12 is used in an aircraft having angularly inclined side opening discharge passages opening from the storage tank 28. In this embodiment the structure of the flow control device is substantially the same as that previously described with the exception that the various calibrator blades 20 and straightener vanes 22 are angularly inclined with respect to the transverse bridge members 24 and side wall members 18 so as to provide the vertical discharge illustrated in FIG. 3 of the drawings or the slight converging discharge illustrated in FIG. 4 of the drawings.

Various other modifications and adaptations of the flow control divice for various different types of aircraft discharge passages will be apparent to those skilled in the art.

I claim

1. A fire extinguishing liquid flow control device for use in the discharge opening of a fire extinguisher storage tank of an aircraft comprising a frame mountable within said discharge opening, said frame comprising
   a. a pair of oppositely disposed longitudinally extending side wall members,
   b. a plurality of calibrator blades extending longitudinally of said frame, said calibrator blades being uniformly laterally spaced with respect to one another, said calibrator blades having an inner end directed inwardly of the storage tank in use and an outer end directed outwardly of the storage tank in use,
   c. a plurality of spacer beams extending laterally of said frame and connected at opposite ends thereof to said side wall members, said spacer beams being disposed at longitudinally spaced intervals along the length of said frame and supporting said calibrator blades in their laterally spaced relationship,
   d. said blades decreasing in thickness in a direction towards said outer end to effect separation of the flow through the frame and induce the formation of globules in the fluid discharging therefrom in use.

2. The device of claim 1 wherein said blades are streamlined and increase in thickness from the inner end thereof to a point adjacent the inner end thereof to separate the liquid flowing therethrough to form a plurality of globules.

3. A device as claimed in claim 2 including longitudinally extending vane means disposed between adjacent calibrator blades, said blade means being thin in cross-section and serving to maintain a straight flow of liquid through said flow control means.

4. A device as claimed in claim 1 wherein each of said walls has an inner face shaped to correspond to the configuration of one-half of a calibrator blade.

5. A device as claimed in claim 4 wherein the side walls of the outermost calibrator blades are downwardly and inwardly angularly inclined to induce a choke effect laterally of the discharging stream of liquid in use.

6. A device as claimed in claim 1 wherein each of said calibrator blades is symmetrically shaped about a central axis extending from the inner end thereof to the outer end thereof, said calibrator blades having a body portion which increases in width rapidly from the inner end thereof to a point adjacent the inner end thereof and thereafter gradually decreases in width to the outer end thereof.

7. In an aircraft having a fire extinguishing storage tank therein, said tank having a discharge opening at the lower end thereof for discharging said liquid and means for normally closing the opening to retain liquid in the storage tank, the improvement of flow control means in said discharge opening comprising a plurality of calibrator blades extending longitudinally of said opening, said calibrator blades being arranged at laterally spaced intervals across the width of the discharge opening, each of said calibrator blades having an inner end disposed inwardly of said tank and an outer end disposed outwardly of said tank, said blades decreasing in thickness in a direction towards the outer end thereof.

8. An aircraft as claimed in claim 7, wherein said blades are streamlined and increase in thickness from the inner end thereof to a point adjacent the inner end thereof.

9. An aircraft as claimed in claim 8, including transverse beam means supporting said calibrator blades in said laterally spaced relationship.

10. An aircraft as claimed in claim 9, including longitudinally extending vane means disposed between adjacent blades, said blades being thin in cross-section and serving to maintain a straight flow of liquid through said flow control means.

11. An aircraft as claimed in claim 7, wherein each of said calibrator blades is symmetrically shaped about a central axis extending from the inner end thereof to the outer end thereof, said calibrator blade means having a body portion which increases in width rapidly from the inner end thereof to a point adjacent the inner end thereof and thereafter gradually decreases in width to the outer end thereof.

* * * * *